United States Patent [19]

Kawakubo et al.

[11] 4,374,225
[45] Feb. 15, 1983

[54] METHOD OF FABRICATING AN ERASER

[75] Inventors: Takamasa Kawakubo, Shinmachi; Kiyosi Hirasawa, Fujioka, both of Japan

[73] Assignee: Mitsubishi Pencil Co., Ltd., Tokyo, Japan

[21] Appl. No.: 196,088

[22] Filed: Oct. 10, 1980

[51] Int. Cl.$^3$ .............................................. B43L 19/00
[52] U.S. Cl. ...................................... 524/302; 15/424
[58] Field of Search ....................... 260/23 H, 23.7 M; 15/424; 524/302

[56] References Cited

U.S. PATENT DOCUMENTS 2,436,456  2/1948  Soday ............................ 260/23.7 M
3,738,951  6/1973  Middlebrook ................ 260/23.7 M

*Primary Examiner*—Paul R. Michl
*Attorney, Agent, or Firm*—Andrus, Sceales, Starke & Sawall

[57] ABSTRACT

A method of fabricating an eraser which contains a main basic material of low crystallizable polyolefin thermoplastic elastomer and normal synthetic rubbers having no hard segment for performing a crosslinking effect, namely, any one or more of chlorinated polyethylene, ethylene-propylene terpolymer, ethylene ethyl acrylate, ethylene-vinyl acetate copolymer, atactic polypropylene, styrene-butadiene rubber, nitrile rubber and the like. The thermoplastic elastomer exhibits similar properties to vulcanized rubber without particular vulcanizing operation and crosslinking reaction. In case that less than 40 parts by weight of the elastomer is contained in the eraser, the composition does not form an eraser, while in case that higher than 100 parts by weight of the elastomer is contained in the eraser, the composition incorporates excessive rubber-like properties. The method comprises the steps of mixing and kneading 50 to 800 parts by weight of factice, 0 to 500 parts by weight of filler and predetermined amount of pigment which 40 to 100 parts by weight of the low crystallizable polyolefin thermoplastic elastomer. Thus, the eraser is remarkably improved in the properties such as resistances to deterioration by aging, exposure to sunlight, migration of plasticizer, and tearing strength by its metallic band.

5 Claims, No Drawings

METHOD OF FABRICATING AN ERASER

BACKGROUND OF THE INVENTION

This invention relates to a method of fabricating an eraser and, more particularly, to a method of fabricating an eraser which contains low crystallizable polyolefin thermoplastic elastomer of a main basic material and normal synthetic rubbers having no hard segment portion for performing a crosslinking effect as required, i.e., any one or more of chlorinated polyethylene, ethylene-propylene terpolymer, ethylene ethyl acrylate, ethylene-vinylacetate copolymer, atactic polypropylene, styrene-butadiene rubber (SBR), nitrile rubber (NBR) and the like to not only provide superior erasing performance as compared with the conventional plastic eraser and to but also remarkably improve its properties such as its deterioration by aging, sunlight exposure, migration of plasticizer, weak body (low rigidity), weak tearing strength by an eraser retaining metallic band of the defects of the conventional eraser.

The conventional erasers sold at present in the market are largely classified into two types, one of which is a natural rubber eraser fabricated by mixing a factice and a filler with natural rubber of its basic material and vulcanizing the composition with sulfur in a semivulcanizing state, and the other of which is a synthetic rubber or plastic eraser fabricated by mixing a filler with emulsion polymerization type vinyl chloride (paste resin) of its basic material, kneading the composition with excess amount of plasticizer and then steam heating the composition to thereby gel the composition in semigelled state.

Although the natural rubber eraser incorporates advantageous properties such as capability of free selection of its rigidity, and large crack and tear strengths, it contrary has insufficient erasing capacity and undesirable using touch. This eraser also accomodates a difficulty in controlling its vulcanized state, namely, in case that the neutral rubber is insufficiently vulcanized, it becomes tacky, while in case that the natural rubber is excessively vulcanized, it loses its erasing properties to consequently occur irregular erasing capacity under quality control of the eraser and does not exhibit stably vulcanized state even after the eraser product is fabricated from the natural rubber, with the result that the eraser is adversely affected by exposure to sunlight and high temperature to thus progressively vulcanize the eraser, to thereby continuously increase its rigidity to cause the eraser to become brittle or remarkably hardened on the surface, and to thereby entirely loss its erasing function. Further, its excess unreacted sulfur blooms to the eraser surface to thereby disadvantageously lower the erasing capacity, and yellows the eraser to cause a great loss of its beauty appearance. Moreover, its production not only necessitates complicated technique requiring high skillfulness at the steps of kneading and vulcanizing crude rubber but also adversely affects its cost due to disposal of a great deal of chip rubber produced after the vulcanizing step without any utilization.

The synthetic rubber or plastic eraser containing mainly vinyl chloride, on the other hand, incorporates very preferable erasing capacity, favorite use feeling and outstanding erasing function better than the natural rubber eraser, however has a difficulty in employing excess amount of plasticizer and controlling the composition in semigelled state upon heating of the composition during production of the eraser and thus requires high technology to obtain uniform quality of eraser in the same manner as in the vulcanizing step of the natural rubber eraser. That is, in case that the plastic eraser is insufficiently gelled, it becomes brittle to cause the composition to be discretely collapsed and to become impossible to erase, while in case that the plastic eraser is excessively gelled, it is not worn in use to cause the eraser chips not to separate from the eraser and to thereby remarkably lower its erasing capacity. Although the plastic eraser product accommodates sufficiently higher resistances to exposure to sunlight and aging than the natural rubber eraser, it causes, since it is semigelled, its liberated plasticizer to bleed on the eraser surface to thereby migrate to other resin such as coated surface of a pencil or pencil case to erode the surface and to thus cause the surface to disadvantageously become tacky. The elimination of the disadvantages is expected, but they are not yet sufficiently countermeasured.

Although a pencil with an eraser or an eraser contained in a mechanical pencil is convenient in use, the eraser thus used requires not only general performance of the ordinal eraser but also, since it is engaged by a metallic band for retaining the eraser and is caulked thereby, its pinch-off or tear resistance by the burrs of the periphery and caulked portion of the band. The reason why the plastic eraser is not used for this application is that the plastic eraser does not have sufficient tear resistance and cannot endure this using pressure. Since the natural rubber eraser has almost durable tear resistance with certain rigidity and resistance to the using pressure, it is mostly used for the present pencil with the eraser and the eraser contained in the mechanical pencil. However, the natural rubber eraser still incorporates such disadvantages that has insufficient weather resistance and severe deterioration by aging as was described before, and particularly becomes impossible to erase in several days under exposure to sunlight. There have been proposed various trials to eliminate these disadvantages by improving vulcanizer or plasticizer or the like, however any of these trials has not yet been completed. There have also been proposed, as its plastic materials for the plastic eraser, employments of one or more of atactic polypropylene, ethylene vinylacetate copolymer (EVA), ethylene-propylene (EP) rubber, styrene-butadiene rubber (SBR), nitrile rubber (NBR), etc. as synthetic rubber and plastic having rubber-like properties in addition to polyvinyl chloride (PVC), however they do not have sufficiently satisfied high quality totally in view of its erasing capacity, mechanical strength and aging stability.

There has further been proposed a prior invention of an eraser having novel block copolymer in addition to natural rubber and polyvinyl chloride (PVC) as disclosed in Japanese Patent Publication No. 23450/1971, the rubber-like composition of which eraser is monovinyl-substituted aromatic hydrocarbon copolymer mainly having conjugated diolefin and styrene of basic materials, so-called styrene (SBS block copolymer) thermoplastic elastomer. When this composition is used as the eraser basic material, it is thermally unstable due to its unsaturated bond, and is difficult to continue kneading and molding steps at high shearing force and temperature for long time. The composition starts thermally deteriorating at higher than 150° C. for long time to finally cause the composition to become brittle. The composition accommodates such disadvantages that, in case where its styrene content is increased in the eraser to improve its workability, it deteriorates its flexibility and exhibits residual strain particularly at high temperature to cause deformation of the eraser or increase in hardness of the eraser to thereby lack its wearing properties so as to undesirably deteriorate its erasing capacity.

Eraser stock material is, incorporating excessive wearing properties, not preferred. In this respect, of the present thermoplastic elastomers, urethane series incorporates the most plastic-like properties and high hardness, polyester, styrene and polyolefin series sequentially incorporate in this order increased rubber-like properties, and the polyolefin series accommodates the most suitable wearing properties as its basic material. The styrene series deteriorates its oil and solvent resistances, and when it is used for the eraser basic material, the resin itself solely incorporates insufficient erasing capacity. Although white factice is added, in order to increase its rigidity, to the resin or other basic material is blended therewith, it is difficult to mix a great deal of factice or basic material with the resin composition due to its deterioration of workability and to tendency of its embrittlement. When this eraser is used for an eraser with a pencil or contained in a mechanical pencil, it is readily torn by its metallic band to be thus insufficient in use.

There have also been proposed prior inventions of resin erasers which respectively employed ethylene-vinyl acetate copolymer (EVA) and atactic polypropylene (APP) as disclosed in Japanese Patent Publication Nos. 44245/1977 and 112429/1977. These resins are apparently rubber-like elastic material, however since they do not incorporate cross-linking structure, they tend to occur cold flow at cold working time to thus cause the eraser material to adhere onto paper surface and to thereby perform no erasing function but to contrary contaminate the paper surface. When the eraser is allowed to stand for under static pressure applied thereto, it is plastically deformed to cause the eraser to disable to retain its configuration. Furthermore, the eraser itself becomes brittle and cannot thus endure its tear by its metallic band.

SUMMARY OF THE INVENTION

Accordingly, an object of this invention is to provide a method of fabricating an eraser which incorporates high erasing capacity, weather and aging resistances by eliminating the disadvantages of the conventional eraser.

Another object of this invention is to provide a method of fabricating an eraser which does not migrate plasticizer contained therein nor erode the coating or resin surface of a pencil or pencil case.

Yet another object of this invention is to provide a method of fabricating an eraser which can adhere its tearing properties by its metallic band and incorporates its body durable for its using pressure.

Still another object of this invention is to provide a method of fabricating an eraser which does not require steps of kneading, vulcanizing and gelling itself necessary for skillfulness.

Still another object of the invention is to provide a method of fabricating an eraser which can effectively utilize regenerative materials of its stock materials.

In order to perform the aforementioned and other objects, the present inventors have discovered low crystallizable polyolefin thermoplastic elastomer, as a result of various points of view and studies conducted to search plastic material satisfying the eraser material incorporating natural rubber-like properties and plastic workability.

Thermoplastic elastomers of the type developed recently as stock material for an eraser exhibiting similar properties to vulcanized rubber without particular vulcanizing operation and crosslinking reaction and being similarly moldable to the ordinal thermoplastic resin are classified largely into styrene, polyurethane and polyester block copolymer, and polyolefin graft copolymerization polymer. The most suitable basic material for the eraser of this invention is preferably the low crystallizable polyolefin graft copolymer which incorporates preferable elasticity, wearing properties and mechanical strength as compared with other thermoplastic elastomers.

DETAILED DESCRIPTION OF THE PREFERRED EMBODIMENTS

According to the present invention, the eraser fabricated by the method of this invention comprises low crystallizable polyolefin thermoplastic elastomer which contains the types from hard resin elastomer like graft copolymer resin produced by conducting ethylene and α-olefin of stock materials by means of coordinating anionic polymerization and one type of graft reaction to soft resin elastomer like rubber having a hardness of 50 (by Shore A scale) on the surface thereof. The eraser fabricated by this invention preferably employs the elastomer resin having relatively low surface hardness like rubber.

The elastomer resin employed in this invention consists of a hard segment portion, namely, a thermoplastic resin layer and a soft segment portion, namely, an amorphous elastomer layer in polymer in the same manner as other thermoplastic elastomers so that the hard segment performs its physical bond and crosslinking structure function corresponding to the crosslinking point of rubber. This resin elastomer is reversible so that, when it is heated, its hard segment portion is molten to cause its crosslinking structure to collapse to thus become fluid state and accordingly moldable in any shape while when it is cooled, the hard segment portion is hardened to cause the molten hard segment portion to become again crosslinking structure. When, therefore, mixing kneading and molding the eraser compositions, it can be molded in the same molding machine as that for the conventional thermoplastic resin, requiring no particular vulcanizing and gelling steps.

Since the resin elastomer employed in this invention has very high flexibility, it does not need mass plasticizer as PVC eraser at all, but has no apprehension of occurring failure due to migration of plasticizer without any plasticizer. Since the resin elastomer incorporates thermally reversible properties to cause no chemical change therof, sprue, runner and scraps produced in the molding step can be reused, resulting in rational resource-saving and energy-saving in its process and cycle as compared with the conventional rubber series and PVC eraser.

Inasmuch as the resin elastomer employed in this invention incorporates not only soft and thermal stability, wide molding temperature range, superior weather and aging resistances peculiar for the polyolefin series, and high resistance to oil, solvent and medicines, but also weaker crosslinking structure than the natural rubber, it accommodates suitable wearing properties most adapted for the basic material of the eraser. In addition, the resin elastomer has superior elastic properties at low temperature and can retain its flexibility up to −70° C. even without plasticizer to thereby allow the elastomer to extremely stably continue its erasing capacity, though the PVC eraser is hardened at low temperature to cause the eraser to become brittle to thereby exhibit its lower erasing performance.

The low crystallizable polyolefin graft copolymer thermoplastic elastomer employed in this invention is readily available as a raw material from various commercial sources. For example, E. I. DuPont de Nemours & Co. sells polyolefin thermoplastic elastomers under the trade designations TPN and SOMEL, and Uniroyal sells such elastomers under the trade designation TPR. Other sources of such elastomers include Mitsui Petrochemical Industries Ltd. selling under the trade designations MILASTOMER and TAFMER, and Sumitom Chemical Company Ltd. selling under the trade designation ESPREN EPF. The polyolefin elastomer used in the present invention is thus well known in the art.

The present invention has been completed to discover the superior properties of the low crystallizable polyolefin graft polymer thermoplastic elastomer as a result of severe studies and searches of all the single and composite materials by the present inventors. That is, the low crystallizable polyolefin graft polymer thermoplastic elastomer forms the basic resin material in the plastic eraser composition of this invention. In case that less than 40 parts by weight of the polyolefin graft polymer thermoplastic elastomer is contained in the eraser, the composition does not form an eraser itself, while in case that higher than 100 parts by weight of the thermoplastic elastomer is contained in the eraser, the composition incorporates excessive rubber-like properties, resulting in slight wearing properties in use to thereby cause the worn scraps not to separate from the eraser to thus disadvantageously lower the erasing capacity of the eraser.

The lower crystallizable polyolefin graft polymer thermoplastic elastomer employed in this invention performs solely the erasing properties as a basic material, however in order to facilitate ready fabrication of the eraser and to improve its smooth using touch and tearing resistance by its metallic band, 50 to 100 parts by weight of normal synthetic rubber having no crosslinking structure may also be added to 100 parts by weight of the low crystallizable polyolefin graft polymer thermoplastic elastomer. The synthetic rubber may contain one or more of synthetic resins incorporating rubber-like properties such as, for example, chlorinated polyethylene, ethylene-propylene-diene terpolymer (EPDM), ethylene ethyl acrylate (EEA), ethylene-vinyl acetate copolymer (EVA), atactic polymer polypropylene (APP), styrene-butadiene rubber (SBR), nitrile rubber (NBR), etc. These synthetic rubbers may impart flexibility to the low crystallizable polyolefin graft polymer thermoplastic elastomer eraser composition, and provide effects of aiding the wearing properties of the eraser in use and increasing the size of erasing scraps to thereby prevent the pulverized and scattered scraps from contaminate the environments. Particularly, the chlorinated polyethylene of these synthetic rubbers incorporates preferable compatibility with the low crystallizable polyolefin graft polymer thermoplastic elastomer to enable mixture of a great deal of factice essentially for enabling filling of a large quantity of filler in the eraser to thereby exhibit high erasing capacity of the eraser. The chlorinated polyethylene thus added to the eraser remarkably enhances the erasing capacity and use feeling, improves the keading and molding properties in its process, increases its bending strength, sufficiently endures using pressure, and exhibits tearing resistance by its metallic band. The chlorinated polyethylene used for the eraser is a rubber-like elastic resin obtained by mixing 30 to 40% by weight of chlorine with polyethylene and chlorinating the mixture, and incorporates no crosslinking structure, but accommodates superior weather, oil, solvent and flame resistances, superior compatibility with various resins, non-crystalline state to thus cause preferable fluidity at molding time and capability of a great deal of filler mixture.

The factice employed in the eraser fabricated by this invention is produced by vulcanizing vegetable or fish oil with sulfur chloride, and is spongy white powder, which is commonly called "white factice". The factice permits the eraser to exhibit erasing function so that the more the factice is mixed with the eraser, the higher the erasing effect becomes in the eraser. However, in case that the factice is excessively added to the eraser, the composition becomes difficult to be molded and brittle to thus cause the eraser to be disabled for use. The factice is preferably mixed in amounts of 50 to 800 parts by weight, preferably more than 500 parts by weight.

The filler may contain, for example, calcium carbonate, magnesium carbonate, silica, clay, alumina, titanium oxide, etc., and/or suitably pigment as coloring material for presenting color in the eraser. The amount of the filler in the eraser depends essentially upon its using touch, rigidity, etc. in response to the intended product eraser, and is preferably in the range of 0 to 500 parts by weight.

All the mixing steps used for the normal rubber and plastic may be applied to the step of mixing the compositions in the eraser in the method of fabricating the eraser of this invention, that is, include a dry blending process by Henschel mixer, a melt blending process by Banbury mixer, a mill blending process by mixing mill, a blending process by screw kneader, etc. The rubber composition uniformly kneaded can be press molded at approx. 150° C. or can be extrusion molded by a normal screw extruder at approx. 150° C.±20° C. The method of fabricating an eraser of this invention preferably comprises the steps of extrusion molding the composition at 150° C.±20° C. under resin pressure of 300±50 kg/cm$^2$ through a die of predetermined shape mounted at a screw extruder having a vent hole, cooling the molded composition, and cutting it in required size.

The present invention will be hereinafter described further by way of typical exemplary process of the preferred embodiments thereof.

| Mixing composition | Mixing example number | | |
| --- | --- | --- | --- |
| | NO. 1 | NO. 2 | NO. 3 |
| Low crystallizable polyolefin thermoplastic elastomer | 90 | 60 | 60 |
| Chlorinated polyethylene | 0 | 30 | 30 |
| Factice | 600 | 400 | 600 |
| Heavy calcium carbonate | 300 | 200 | 200 |

EXAMPLE 1

Stock materials mixed at the ratio as listed above table were uniformly kneaded at 130±20° C. of surface temperature of mixing mill to thus obtain rubber composition. After this rubber composition was hot pressure molded at 110° to 150° C. under the pressure of approx. 50 kg/cm² for 5 minutes, it was cut in size of 1.5×2.0×5.0 mm to thus produce eraser products.

EXAMPLE 2

Stock materials mixed at the ratio as listed in the above table in the same manner as the Example 1 were uniformly kneaded at 130±20° C. by Banbury mixer to thus obtain rubber composition. The composition was charged into a pelletizer and was thus formed in granular state. After the granular composition was extruded at 130° C. of the screw unit and 150° C. of die unit under the pressure of 300 kg/cm² in a 30 mm-dia. bend type double-screw extruder, it was cooled and cut in size of 0.7-dia.×2.0 mm to thus obtain circular rod products.

The eraser obtained according to the above process exhibited superior erasing capacity of pencil characters and letters to that of the PVC eraser sold in the market, no failure on the coating of pencil and pencil case due to its migration of plasticizer. Although the PVC eraser is hardened at low temperature to thereby deteriorate its use feeling, the eraser obtained according to this invention presented the same use feeling at low temperature as at room temperature. When the eraser was applied to a pencil attached with an eraser and to an eraser contained in a mechanical pencil, it performs superior tearing resistance by its metallic band. The eraser fabricated by this invention occurred no low erasing capacity rate due to exposure to sunlight nor aging deterioration as compared with the natural rubber eraser. When the eraser fabricated by this invention was teated by exposure to sunlight in a showwindow, it retained all the properties as initially incorporated though the natural rubber eraser exhibited impossible erasing capacity in three days.

It should be understood from the foregoing description that since the eraser of this invention is thus fabricated, it can incorporate no migration of plasticizer to coating of a pencil or pencil case contrary to the conventional plastic eraser, suitable rigidity, preferable tearing resistance by its metallic band, no deterioration by exposure to sunlight and aging as compared with the natural rubber eraser, and retain stable properties even at low temperature in high quality. It should also be appreciated that the method of fabricating the eraser of this invention does not require, as was described before, the gelling and vulcanizing steps necessary for difficult skillfulness in the steps as the conventional plastic and natural rubber erasers but allows effective use of stock materials without loss advantageously.

What is claimed is:

1. A method of fabricating an eraser comprising the step of mixing and kneading 50 to 800 parts by weight by factice, 0 to 500 parts by weight of filler and predetermined amount of pigment with 40 to 100 parts by weight of low crystallizable polyolefin graft copolymer thermoplastic elastomer obtained by conducting ethylene and α-olefin of stock materials by means of coordinating anionic polymerization and one type of graft reaction.

2. A method of fabricating an eraser according to claim 1 further comprising the step of adding, mixing and kneading the mixed produced with 50 to 100 parts by weight of one or more of normal synthetic rubbers having rubber-like properties selected from the group consisting of chlorinated polyethylene, ethylene-propylene terpolymer, ethylene ethyl acrylate, ethylene-vinyl acetate copolymer, atactic polypropylene, styrene-butadiene rubber (SBR) and nitrile rubber (NBR) having no hard segment portion for performing crosslinking effect to the mixed product whereby preventing bending crack or tearing thereof by a metallic band upon using as an eraser attached to a pencil or contained in a mechanical pencil and improving use feeling quality and workability at fabricating step.

3. A method of fabricating an eraser according to claim 1 wherein said elastomer consists of a hard segment portion including a thermoplastic resin layer and a soft segment portion including an amorphous elastomer layer in polymer.

4. A method of fabricating an eraser according to claim 1 wherein said factice is produced by vulcanizing vegetable or fish oil with sulfur chloride.

5. A method of fabricating an eraser according to claim 1 wherein said filler comprises one or more of calcium carbonate, magnesium carbonate, silica, clay, alumina, titanium oxide and/or pigment and is contained in the eraser in the range of 0 to 500 parts by weight.

* * * * *